Patented June 30, 1953

2,644,012

UNITED STATES PATENT OFFICE 2,644,012

4-SUBSTITUTED-VINYLCYCLOHEXENES AND THE PRODUCTION THEREOF

Jerome Korman, William B. Reid, Jr., Alan H. Nathan, and John A. Hogg, Kalamazoo, Mich., assignors to The Upjohn Company, Kalamazoo, Mich., a corporation of Michigan No Drawing. Application October 5, 1949, Serial No. 119,777

6 Claims. (Cl. 260—611)

The present invention relates to a novel group of vinylcyclohexenes, and is more particularly concerned with novel 1-methyl-2-vinyl-4-substituted vinylcyclohexenes, and to a method for the production thereof.

The compounds of the present invention have the general structural formula:

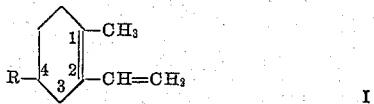

wherein R is hydroxy or a group convertible to hydroxy with the aid of hydrolysis. Preferably, R is a member of the group consisting of hydrocarbonoxy, acyloxy, arylsulfonoxy, tetrahydropyranyloxy, and hydroxy.

By the term "hydrocarbonoxy," as employed herein, are included ether radicals of a hydrocarbon nature, of the formula R'O—, wherein R' is a hydrocarbon radical, and especially such radicals wherein the hydrocarbon radical contains from one to ten carbon atoms, inclusive. Representative hydrocarbonoxy radicals include the methoxy, ethoxy, propoxy, isopropoxy, butoxy, isobutoxy, pentoxy, hexoxy, heptoxy, octoxy, nonoxy, decoxy, cyclohexoxy, cyclopentoxy, cyclopropoxy, benzyloxy, phenethoxy, and the like. While other ether radicals, such as those wherein the hydrocarbon radical (R') contains substituents which are stable to both acid and basic treatment, such as alkoxy, e. g., methoxy, ethoxy; or aromatic halo, e. g., chloro, bromo, and the like, as in compounds wherein R' represents chlorobenzyl, methoxymethyl, methoxybenzyl, and the like, are also included within the scope of R', such substituted ether radicals are not included by the term "hydrocarbonoxy." Preferred hydrocarbonoxy radicals are the alkoxy radicals, wherein the alkoxy group contains from one to eight carbon atoms, inclusive, and, of the alkoxy radicals, the preferred embodiment is methoxy.

By the term "acyloxy," as employed herein, are included esters of the 4-hydroxy group with organic carboxylic acids, such as formic, acetic, propionic, butyric, valeric, hexanoic, heptanoic, octanoic, cyclopentanoic, cyclohexanoic, benzoic, phenylacetic, naphthoic, and the like. Preferably the acyloxy group is derived from an unsubstituted organic acid of solely hydrocarbon nature containing from one to ten carbon atoms, inclusive, and of this class the acetoxy group is the preferred embodiment, but esters of the 4-hydroxy group with substituted acids such as chlorobenzoic, bromobenzoic, methoxyacetic, and the like, are also included within the term "acyloxy." Preferred acyloxy groups are those derived from a monocarboxylic aliphatic acid containing from one to eight carbon atoms, inclusive.

By the term "arylsulfonoxy," as employed herein, are included esters of the 4-hydroxy group with an arylsulfonic acid, such as benzenesulfonic, para-toluenesulfonic, and the like, which acids preferably contain up to and including ten carbon atoms. The arylsulfonoxy radicals all comprise the structure R''—SO$_2$—O—, wherein R'' represents the aryl radical, which is preferably of a hydrocarbon nature, but which can also contain substituents.

The tetrahydropyranyloxy radical has the formula:

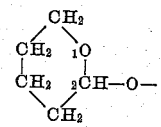

being derived from tetrahydropyran, and the vinylcyclohexenes containing this radical may also be referred to as 4-tetrahydropyranyl ethers.

The compounds of the present invention which are described and claimed in U. S. Patent No. 2,511,815, issued June 13, 1950, to Scott and Goldberg, are useful in the preparation of addition polymers of the vinyl type, as well as being extremely useful intermediates in the preparation of Diels-Alder adducts having an angular-methyl group.

Compounds of the present invention, wherein R is hydrocarbonoxy or substituted hydrocarbonoxy, can be prepared starting with a para-hydrocarbonoxy phenol, of the formula:

wherein R' is a hydrocarbon or substituted hydrocarbon radical, as indicated in the foregoing definition of R. Such compounds readily absorb three molecules of hydrogen using a nickel catalyst at temperatures of about 130 to 300 degrees centigrade, resulting in the corresponding saturated compound, a para-hydrocarbonoxycyclohexanol having the formula:

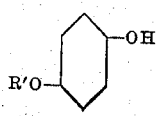

III which can then be oxidized to a para-hydrocarbonoxycyclohexanone, of the formula:

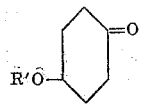
IV wherein R' has the value previously assigned [Helfer, Helv. Chim. Acta. 7, 953 (1924)], by the use of potassium dichromate and sulfuric acid.

Compound III is then converted via a Claisen reaction using diethyl oxalate, $(CO_2C_2H_5)_2$, and either sodium methoxide or sodium ethoxide, into a 2-(ethyl glyoxalyl)-4-hydrocarbon-oxycyclohexanone-1, of the formula:

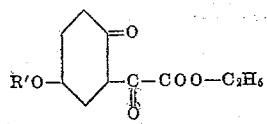
V which is readily converted by means of heat and powdered soft glass into a 2-carbethoxy-4-hydrocarbonoxycyclohexanone-1, of the formula:

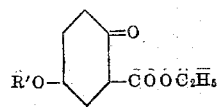
V wherein R' has the value previously assigned [Cook and Laurence, J. Chem. Soc., page 58 (1938)].

Compound VI is then condensed with a tertiary amine of the formula:

$$ClCH_2CH_2NR'''_2 \quad \text{VII}$$

wherein R''' is an alkyl radical, e. g., methyl or ethyl, in the presence of sodium or potassium. Ordinarily the reaction is conducted in an inert organic solvent, such as benzene, toluene, or xylene, at a temperature between about eighty and 140 degrees centigrade, and preferably at about the reflux temperature of the solvent employed. The reaction is complete in from ten to twenty hours, at the end of which time the product, a 2-carbethoxy-2-dialkylaminoethyl-4-hydrocarbonoxycyclohexanone-1, having the formula:

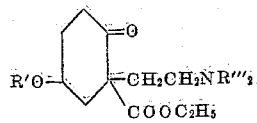
VIII wherein R' and R''' have the values previously assigned, may be isolated in conventional manner, such as by extraction from the organic layer with dilute acid, e. g., hydrochloric or sulfuric, and subsequent neutralization with alkali, e. g., potassium carbonate or sodium hydroxide. The crude product is then extracted with a solvent such as ether or benzene, and isolated by distillation of solvent.

Compound VIII is then decarbalkoxylated, as with a ten to twenty percent concentration of hydrochloric or sulfuric acid, at a temperature between about eighty and 110 degrees centigrade, preferably at about reflux temperature, over a period of about ten to twenty hours, or, alternatively, with barium hydroxide in alcohol, to produce a 2-dialkylaminoethyl-4-hydrocarbonoxycyclohexanone-1, of the formula:

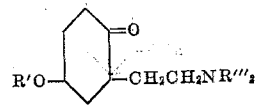
IX wherein R' and R''' have the previously-assigned values. After preparation from the reaction product and isolation in conventional manner, as by evaporation of the aqueous acid hydrolyzing medium under reduced pressure, followed by dilution with water and subsequent treatment with alkali, the product is ether-extracted, distilled, and then reacted with methyl lithium in the presence of an organic solvent for the reaction such as diethyl ether, tetrahydrofuran, or N-methylmorpholine. The reaction is preferably conducted at the reflux temperature of the solvent employed, and is ordinarily complete in a period of from two to four hours. The product of the reaction is a 1-methyl-2-dialkylaminoethyl-4-hydrocarbonoxycyclohexanol-1, having the formula:

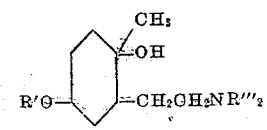
X wherein R' and R''' have the values previously assigned. This compound (X) is preferably not isolated, but is rather dehydrated without separation from the reaction product using a suitable dehydrating agent, such as potassium acid sulfate ($KHSO_4$), thionyl chloride in pyridine, phosphorous tribromide in pyridine, aluminum oxide with Compound X in the vapor phase, and the like, with phosphorous tribromide in pyridine being preferred, any of which dehydration procedures are generally well-known in the art and may be conducted according to established procedure for such dehydrations. The reaction product, a 1-methyl-2-dialkylaminoethyl-4-hydrocarbonoxycyclohexene-1, has the formula:

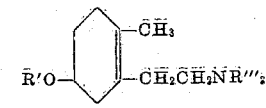
XI wherein R' and R''' have the values previously given, and, after isolation by conventional procedure, as by dissolving in water, neutralizing with alkali, extracting with ether, and subsequent distillation, is subjected to a Hoffman exhaustive methylation in the next step in the process.

In this step, Compound XI is subjected to treatment with dimethyl sulfate followed by potassium hydroxide of approximately fifty percent weight concentration at a temperature of between about 100 and 140 degrees centigrade, preferably at about 100 degrees centigrade. Alternatively, this step may be conducted using methyl iodide, followed by moist silver oxide, $Ag_2O$, within the temperature range of about 100 to 140 degrees centigrade. Either of these two procedures is productive of Compound I, having the formula:

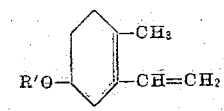
I wherein R' has the value indicated in the foregoing, below the previous formula for Compound I.

*Example A.*—2 - carbethoxy-2-(beta-diethylaminoethyl)-4-methoxycyclohexanone-1 (VIII)

A suspension of sodium sand (0.10 mole) in toluene is treated dropwise during thirty minutes with one-tenth mole of 2-carbethoxy-4-methoxycyclohexanone (VI). After addition, the mixture is heated under reflux for four hours, and then stirred at room temperature overnight. The suspension of the sodio-compound is again heated to boiling and treated dropwise during three hours with beta-diethylaminoethyl chloride (0.10 mole) dissolved in anhydrous toluene. After refluxing for five hours, the mixture is cooled and extracted with dilute hydrochloric acid. The acid extract is neutralized with sodium hydroxide solution, with cooling, and thereafter extracted with ether. The ether extracts are washed, dried, and the ether evaporated. The residue is distilled in vacuo, boiling point 132–135 degrees centigrade at 0.15 millimeter of mercury pressure, $n_D^{20}=1.4715$.

*Example B.—2-(beta-diethylaminoethyl)-4-methoxycyclohexanone-1 (IX)*

The carbethoxy compound (VIII) is hydrolyzed and decarboxylated by refluxing overnight with twenty percent sulfuric acid. After cooling, the mixture is neutralized and extracted with ether. The extract is washed, dried, and evaporated. The residue is distilled in vacuo, to yield Compound IX, boiling point 112 to 114 degrees centigrade at 0.8 millimeter of mercury pressure, $n_D^{20}=1.4680$, oxalate M. P. 111–112 degrees centigrade.

*Example C.—1-methyl-2-(beta-diethylaminoethyl)-4-methoxycyclohexanol-1 (X)*

An excess (0.15 mole) of commercial methyl lithium, dissolved in diethyl ether, is treated dropwise during fifteen minutes with 2-(beta-diethylaminoethyl)-4-methoxycyclohexanone (IX) (0.035 mole). After addition is complete, the mixture is heated under reflux for three hours, cooled, and the complex hydrolyzed by dropwise addition of a cold ten per cent solution of ammonium chloride. The aqueous layer is saturated with potassium carbonate and extracted with ether. The combined ether extracts are extracted with dilute hydrochloric acid, and this extract, after being neutralized with sodium hydroxide, is extracted with ether. The organic extract is washed, dried, and evaporated. The residue is distilled in vacuo to yield Compound X, boiling point 90 to 92 degrees centigrade at 0.03 millimeter of mercury pressure, $n_D^{20}=1.4750$.

*Example D.—1-methyl-2-(beta-diethylaminoethyl)-4-methoxycyclohexene-1 (XI)*

The alcohol (X) (0.01 mole) and absolute pyridine (0.01 mole) are dissolved in anhydrous benzene. The solution is treated with stirring and cooling during ten minutes with phosphorus tribromide (0.011 mole) dissolved in benzene. The mixture is stirred for three hours on the steam bath. The filtered solution of the bromide is treated with an excess of pyridine and warmed for thirty minutes at 100 degrees centigrade. The solution is cooled, decanted from the crystals of pyridine hydrobromide, washed, dried, and the solvents evaporated. The residue is distilled in vacuo to yield compound XI, boiling point 85 to 87 degrees centigrade at a pressure of 0.10 millimeter of mercury, $n_D^{20}=1.4730$, oxalate salt melting point 101–102 degrees centigrade.

*Example E.—Hoffman exhaustive methylation of 1-methyl-2-(beta-diethylaminoethyl)-4-methoxycyclohexene-1 (XI) to produce 1-methyl-2-vinyl-4-methoxycyclohexene-1 (I)*

The tertiary amine (XI) (one mole) is converted to the methiodide salt by treatment with excess methyl iodide (3–4 moles) in ether over a period of 24 hours. The salt is filtered, dissolved in methyl or ethyl alcohol, and refluxed for one hour with one and one-half moles of moist silver oxide for conversion to the quaternary hydroxide.

The silver iodide is filtered and, after solvent evaporation, the residual quaternary hydroxide is heated to between about 120 and 160 degrees centigrade under reduced pressure. The diene (I) distills as decomposition occurs.

The diene product (I) is taken up in ether, dried, and fractionated under reduced pressure after evaporation of solvent, boiling point 82 to 84 degrees centigrade at a pressure of 13.0 millimeters of mercury, $n_D^{20}=1.5068$.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the preparation of a 1-methyl-2-vinyl-4-hydroetheric-cyclohexene-1 having the formula:

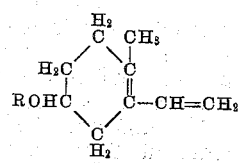

wherein R of the ether radical represents a hydrocarbon radical containing from 1 to 10 carbon atoms, inclusive, comprising the steps of reacting a 1-methyl-2-dialkylaminoethyl-4-etheric-cyclohexene-1 having the formula:

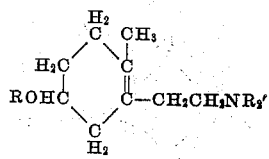

wherein R has the value previously assigned and R' is an alkyl radical, with methyl iodide to form a quaternary ammonium iodide compound of the formula:

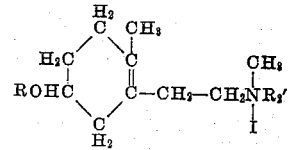

heating the quaternary ammonium iodide compound with moist silver oxide in a solvent to form a quaternary ammonium hydroxide compound having the formula:

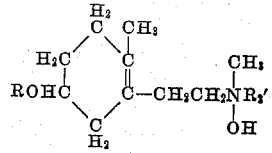

separating the quaternary ammonium hydroxide compound from the silver iodide and any excess silver oxide and heating the quaternary ammonium hydroxide compound to cause decomposition to a 1-methyl-2-vinyl-4-etheric-cyclohexene-1.

2. The process of claim 1 wherein R represents a methyl radical.

3. The process of claim 1, wherein the quaternary ammonium hydroxide compound is heated to a temperature between about 100 and 160 degrees centigrade.

4. The process of claim 1, wherein R is methyl and R' is ethyl.

5. A process for the preparation of a 1-methyl-2-vinyl-4-etheric-cyclohexene-1 having the formula:

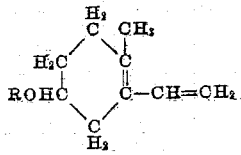

wherein R of the ether radical represents a hydrocarbon radical containing from 1 to 10 carbon atoms, inclusive, comprising the steps of reacting a 1-methyl-2-dialkylaminoethyl-4-etheric-cyclohexene-1 having the formula:

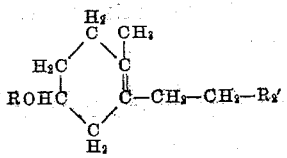

wherein R has the value previously assigned and R' is an alkyl radical, with a reagent selected from the group consisting of (a) methyl iodide followed by moist silver oxide and (b) dimethyl sulfate followed by alkali metal hydroxide, and thereafter heating the thus-produced quaternary ammonium hydroxide compound to cause decomposition to a 1-methyl-2-vinyl-4-etheric-cyclohexene-1.

6. A process for the preparation of a 1-methyl-2-vinyl-4-etheric-cyclohexene-1 having the formula:

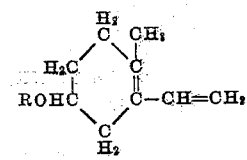

wherein R of the ether radical represents a hydrocarbon radical containing from 1 to 10 carbon atoms, inclusive, comprising the steps of reacting a 1-ethyl-2-dialkylaminoethyl-4-etheric-cyclohexene-1 having the formula:

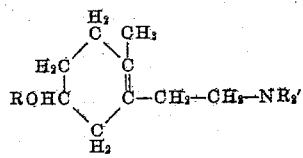

wherein R has the value previously assigned and R' is an alkyl radical, with dimethyl sulfate to form a quaternary ammonium sulfate compound of the formula:

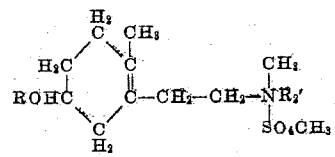

heating the thus-produced quaternary ammonium sulfate compound with aqueous potassium hydroxide at a temperature between about 100 and 140 degrees centigrade to form a quaternary ammonium hydroxide compound which is decomposed by the heating to a 1-methyl-2-vinyl-4-etheric-cyclohexene-1.

JEROME KORMAN.
WILLIAM B. REID, Jr.
ALAN H. NATHAN.
JOHN A. HOGG.

References Cited in the file of this patent

UNITED STATES PATENTS

| Number | Name | Date |
|---|---|---|
| 2,511,815 | Scott et al. | June 13, 1950 |